US012645129B2

(12) United States Patent
Hara et al.

(10) Patent No.: US 12,645,129 B2
(45) Date of Patent: Jun. 2, 2026

(54) OPTICAL MODULATOR

(71) Applicant: TDK Corporation, Tokyo (JP)

(72) Inventors: Hiroki Hara, Tokyo (JP); Shinji Iwatsuka, Tokyo (JP)

(73) Assignee: TDK Corporation, Tokyo (JP)

( * ) Notice: Subject to any disclaimer, the term of this patent is extended or adjusted under 35 U.S.C. 154(b) by 367 days.

(21) Appl. No.: 17/773,780

(22) PCT Filed: Oct. 26, 2020

(86) PCT No.: PCT/JP2020/040044
§ 371 (c)(1),
(2) Date: May 2, 2022

(87) PCT Pub. No.: WO2021/117358
PCT Pub. Date: Jun. 17, 2021

(65) Prior Publication Data
US 2022/0382118 A1 Dec. 1, 2022

(30) Foreign Application Priority Data

Dec. 12, 2019 (JP) ................................. 2019-224546

(51) Int. Cl.
$G02F\ 1/225$ (2006.01)
$G02F\ 1/035$ (2006.01)
$G02F\ 1/21$ (2006.01)
(52) U.S. Cl.
CPC .............. $G02F\ 1/225$ (2013.01); $G02F\ 1/035$ (2013.01); $G02F\ 1/212$ (2021.01)
(58) Field of Classification Search
CPC .......... G02F 1/225; G02F 1/035; G02F 1/212; G02B 6/125; G02B 2006/12119

(Continued)

(56) References Cited

U.S. PATENT DOCUMENTS 4,709,978 A * 12/1987 Jackel .................... G02F 1/225
385/3
7,333,691 B1 * 2/2008 Gill ...................... G02B 6/1223
359/344

(Continued)

FOREIGN PATENT DOCUMENTS

CN 110441928 A 11/2019
JP 2005-107229 * 4/2005 ............. G02F 1/035

(Continued)

OTHER PUBLICATIONS

International Search Report issued in corresponding International Patent Application No. PCT/JP2020/040044, dated Dec. 8, 2020, with English translation.

*Primary Examiner* — Robert Tavlykaev
(74) *Attorney, Agent, or Firm* — Rimon P.C.

(57) ABSTRACT

To prevent deterioration in an extinction ratio due to asymmetry between a pair of optical waveguides.

An optical modulator has a Mach-Zehnder optical waveguide including mutually parallel first and second waveguides and a signal electrode for controlling the phase of light propagating in the Mach-Zehnder optical waveguide. The first and second waveguides have a first section in which the second waveguide has a line width smaller than that of the first waveguide and a second section in which the first waveguide has a line width smaller than that of the second waveguide. The first section and the second section are replaced with each other in curved parts.

5 Claims, 7 Drawing Sheets

(58) Field of Classification Search
USPC ......................................................... 385/1–3
See application file for complete search history.

(56) References Cited

U.S. PATENT DOCUMENTS

| | | | | |
|---|---|---|---|---|
| 7,916,981 B2 * | 3/2011 | Kawano | ................ | G02F 1/2255 |
| | | | | 385/2 |
| 9,036,954 B2 * | 5/2015 | Kobrinsky | .............. | G02F 1/035 |
| | | | | 385/3 |
| 9,170,438 B2 * | 10/2015 | Evans | ..................... | G02F 1/025 |
| 9,746,743 B1 * | 8/2017 | Rabiei | ................ | G02B 6/12009 |
| 10,133,141 B2 * | 11/2018 | Evans | ................... | G02F 1/2257 |
| 10,133,142 B2 * | 11/2018 | Doerr | ..................... | G02F 1/025 |
| 2002/0122630 A1 * | 9/2002 | Bona | ................. | G02B 6/12007 |
| | | | | 385/39 |
| 2011/0305412 A1 | 12/2011 | Sugiyama | | |
| 2015/0138619 A1 | 5/2015 | Iwatsuka et al. | | |
| 2016/0334648 A1 * | 11/2016 | Lu | ......................... | G02F 1/2257 |
| 2018/0039151 A1 * | 2/2018 | Doerr | .................. | H04B 10/516 |
| 2020/0218126 A1 | 7/2020 | Iwatsuka et al. | | |

FOREIGN PATENT DOCUMENTS

| | | | | | |
|---|---|---|---|---|---|
| JP | 2005-107229 A | 4/2005 | | | |
| JP | 2008-052103 A | 3/2008 | | | |
| JP | 2011-257634 A | 12/2011 | | | |
| JP | 2015-118371 A | 6/2015 | | | |
| JP | WO 2017/183484 A1 * | 10/2017 | ............. | G02F 1/035 | |
| WO | 2019/039215 A1 | 2/2019 | | | |

* cited by examiner

OPTICAL MODULATOR

CROSS REFERENCE TO RELATED APPLICATIONS

This application is the U.S. National Phase under 35 U.S.C. § 371 of International Application No. PCT/JP2020/040044, filed on Oct. 26, 2020, which claims the benefit of Japanese Patent Application No. 2019-224546, filed on Dec. 12, 2019, the entire contents of each are hereby incorporated by reference.

TECHNICAL FIELD

The present invention relates to an optical modulator, more particularly, to a waveguide structure of a Mach-Zehnder optical modulator.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

The optical modulator is one of the typical electro-optical devices, and a Mach-Zehnder optical modulator in which an optical waveguide is formed by Ti (titanium) diffusion in the vicinity of the surface of a lithium niobate single-crystal substrate has been put to practical use (refer to, for example, a Patent Document 1). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, a Patent Document 2 disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

CITATION LIST

Patent Document

[Patent Document 1] Japanese Patent No. 5,488,226
[Patent Document 2] Japanese Patent No. 6,456,662

SUMMARY OF THE INVENTION

Problem to be Solved by the Invention

Two mutually parallel optical waveguides constituting a Mach-Zehnder optical waveguide sometimes have asymmetry in terms of the line width due to, for example, a manufacturing process. In this case, the effective refractive indices of the two optical waveguides differ from each other, so that wavelength dependence occurs in light propagation characteristics. This brings light (background light) of a wavelength outside the operating wavelength, which is mixed in input/output light, in a guided state even when the operating wavelength of the input/output light is in an OFF state. As a result, light intensity increases in an OFF state to deteriorate an extinction ratio.

An object of the present invention is therefore to provide an optical modulator capable of preventing deterioration in an extinction ratio due to asymmetry between a pair of optical waveguides.

Means for Solving the Problem

The present inventors have made intensive studies on a method for preventing deterioration in an extinction ratio due to a difference between effective refractive indices of a pair of optical waveguides and have found that by making the length of a section in which the first one of the pair of optical waveguides has a larger line width than the second one thereof and the length of a section in which the second one of the pair of optical waveguides has a larger line width than the first one thereof substantially equal to each other, the effective refractive indices of the pair of optical waveguides can be made equal to each other to thereby improve the extinction ratio.

The present invention has been made based on the above technical knowledge, and an optical modulator according to the present invention includes: a Mach-Zehnder optical waveguide having an input waveguide, a demultiplexer demultiplexing light propagating in the input waveguide, first and second waveguides extending in parallel from the demultiplexer, a multiplexer multiplexing lights propagating in the first and second waveguides, and an output waveguide propagating light output from the multiplexer; and a signal electrode controlling the phase of light propagating in the Mach-Zehnder optical waveguide. The first and second waveguides have a first section in which the second waveguide has a line width smaller than that of the first waveguide and a second section in which the first waveguide has a line width smaller than that of the second waveguide. The first section and second section are replaced with each other in curved part.

According to the present invention, it is possible to prevent deterioration in the extinction ratio due to asymmetry between the first and second waveguides constituting the pair of optical waveguides.

In the present invention, the first and second waveguides preferably have a folded structure obtained by alternately combining a straight part and a curved part, and the first section and the second section are preferably replaced with each other in the curved part. The replacing part of the magnitude relation between the line widths of the first and second waveguides constituting the Mach-Zehnder optical waveguide is made into a folded shape, so that the line width can be continuously changed, allowing prevention of an optical loss and reduction in the size of the optical modulator.

In the present invention, the first and second waveguides preferably have an even number of the curved parts. This can make the lengths of the first and second waveguides constituting the Mach-Zehnder optical waveguide in the curved parts equal to each other.

In the present invention, the first and second waveguides preferably have first to third straight parts provided mutually in parallel, a first curved part connecting the first and second straight parts, and a second curved part connecting the second and third straight parts. The first section is preferably provided in the first and third straight parts, the second section is preferably provided in the second straight part. The first and second sections are preferably replaced with each other in the first and second curved parts. This can achieve an optical modulator with improved symmetry between the first and second waveguides.

In the present invention, the waveguide is preferably a ridge waveguide wherein a lithium niobate film formed on a substrate is shaped into a ridge. This allows the curved part to have a large curvature, leading to reduction in the size of the optical modulator.

The optical modulator according to the present invention preferably has a buffer layer that covers at least the upper surfaces of the first and second waveguides, and the signal electrode is preferably opposite to the upper surface of the first waveguide through the buffer layer. This can achieve an optical modulator with low operating voltage and excellent electrooptic characteristics.

Advantageous Effects of the Invention

According to the present invention, there can be provided an optical modulator capable of preventing deterioration in the extinction ratio due to asymmetry between a pair of optical waveguides.

BRIEF DESCRIPTION OF DRAWINGS

FIGS. 4A to 4C are schematic cross-sectional views of the optical modulator 1 illustrated in FIGS. 1 and 2, wherein FIG. 4A is a cross-sectional view taken along the line Xa-Xa in FIGS. 1 and 2, FIG. 4B is a cross-sectional view taken along the line Xb-Xb in FIGS. 1 and 2, and FIG. 4C is a cross-sectional view taken along the line Xc-Xc in FIGS. 1 and 2.

FIGS. 5A and 5B are schematic plan views each illustrating a configuration of an optical modulator according to a second embodiment of the present invention, wherein FIG. 5A illustrates only an optical waveguide, and FIG. 5B illustrates the entire of the optical modulator including traveling-wave electrodes.

FIGS. 6A and 6B are schematic cross-sectional views of the optical modulator illustrated in FIGS. 5A and 5B, wherein FIG. 6A is a cross-sectional view taken along the line Xa-Xa in FIGS. 5A and 5B, and FIG. 6B is a cross-sectional view taken along the line Xb-Xb in FIGS. 5A and 5B.

MODE FOR CARRYING OUT THE INVENTION

Preferred embodiments of the present invention will be explained below in detail with reference to the accompanying drawings.

Figure 1:
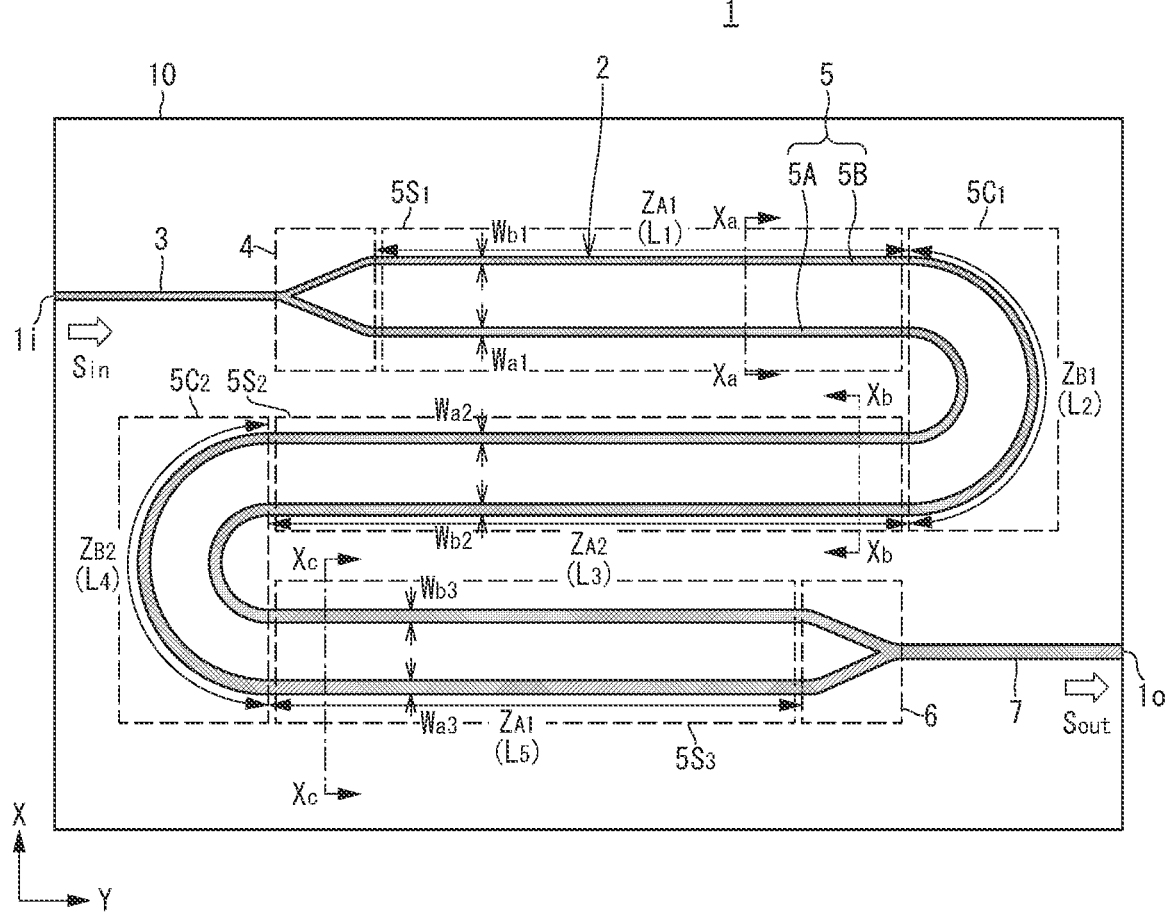
FIG. 1 is a schematic plan view illustrating a configuration of an optical modulator according to a first embodiment of the present invention, and particularly illustrating only an optical waveguide.
Figure 2:
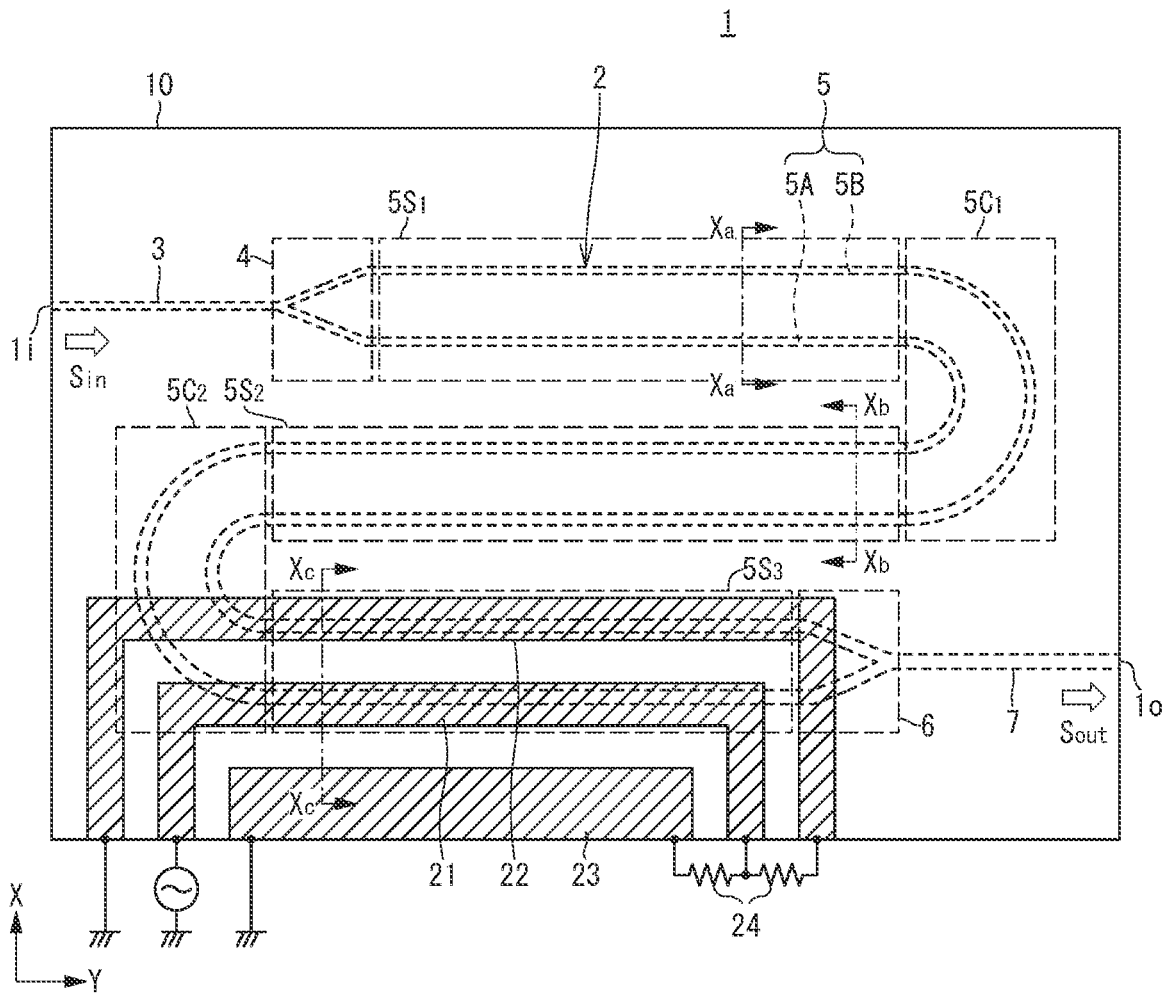
FIG. 2 is a schematic plan view illustrating the configuration of the optical modulator according to the first embodiment of the present invention, and particularly illustrating the entire of the optical modulator including traveling-wave electrodes.

FIGS. 1 and 2 are schematic plan views each illustrating the configuration of an optical modulator according to a first embodiment of the present invention. FIG. 1 illustrates only an optical waveguide, and FIG. 2 illustrates the entire configuration of the optical modulator including traveling-wave electrodes.

As illustrated in FIGS. 1 and 2, an optical modulator 1 according to the present embodiment includes a Mach-Zehnder optical waveguide 2 formed on a substrate 10 and having first and second waveguides 5A and 5B provided in parallel to each other, a signal electrode 21 provided so as to overlap the first waveguide 5A in a plan view, a first ground electrode 22 provided so as to overlap the second waveguide 5B in a plan view, and a second ground electrode 23 provided on the side opposite to the first ground electrode 22 with respect to the signal electrode 21.

The Mach-Zehnder optical waveguide 2 is an optical waveguide having a Mach-Zehnder interferometer structure. The Mach-Zehnder optical waveguide 2 has, in the order from an optical input port 1i toward an optical output port 1o, an input waveguide 3 constituted by a single optical waveguide, a demultiplexer 4 for demultiplexing light propagating in the input waveguide 3, a pair of parallel waveguides 5 (first and second waveguides 5A and 5B) extending from the demultiplexer 4, a multiplexer 6 for multiplexing lights propagating in the first and second waveguides 5A and 5B, and an output waveguide 7 constituted by a single optical waveguide and propagating light output from the multiplexer 6.

The input waveguide 3 extending from the optical input port 1i is connected to one ends of the first and second waveguides 5A and 5B through the demultiplexer 4, and the other ends of the first and second waveguides 5A and 5B are connected to the output waveguide 7 through the multiplexer 6. An input light $S_{in}$ input to the optical input port 1i is input to the demultiplexer 4 through the input waveguide 3 to be demultiplexed. The demultiplexed lights travel through the first and second waveguides 5A and 5B and then multiplexed at the multiplexer 6. The multiplexed light travels through the output waveguide 7 and is output from the optical output port 1o as a modulated light $S_{out}$.

In the present embodiment, the Mach-Zehnder optical waveguide 2 is constituted by a combination of a straight part and a curved part. The first and second waveguides 5A and 5B of the Mach-Zehnder optical waveguide 2 have mutually parallel first to third straight parts $5S_1$ to $5S_3$, a first curved part $5C_1$ connecting the first straight part $5S_1$ and second straight part $5S_2$ together and a second curved part $5C_2$ connecting the second straight part $5S_2$ and the third straight part $5S_3$ together. The first and second curved parts $5C_1$ and $5C_2$ are formed into concentric half circles so as to turn the traveling direction of the optical waveguide by 180°. As described above, the first and second waveguides 5A and 5B have a folded structure obtained by alternately combining the straight and curved parts.

The first to third straight parts $5S_1$ to $5S_3$ of the first and second waveguides 5A and 5B of the Mach-Zehnder optical waveguide 2 extend in the longitudinal direction (Y-direction) of the substrate 10, and the optical input port 1$i$ and the optical output port 1$o$ are provided respectively at one and the other end sides of the substrate 10 in the longitudinal direction. In the present embodiment, the first and second waveguides 5A and 5B preferably have the even number of the curved parts 5C. That is, the first and second waveguides 5A and 5B preferably have 2n+1 (n is a positive integer) straight parts 5S and 2n curved part 5C. Thus, the entire length of the first waveguide 5A and the entire length of the second waveguide 5B can be made equal at the plurality of the curved parts 5C to make it possible to improve symmetry between the first and second waveguides 5A and 5B.

In the configuration described above, the input light $S_{in}$ input to the optical input port 1$i$ is then input to one end of the first straight part $5S_1$. The input light $S_{in}$ then travels from the one end of the first straight part $5S_1$ toward the other end thereof, turns back at the first curved part $5C_1$, travels from one end of the second straight part $5S_2$ toward the other end thereof in the direction opposite to that in the first straight part $5S_1$, turns back at the second curved part $5C_2$, and travels from one end of the third straight part $5S_3$ toward the other end thereof in the same direction as in the first straight part $5S_1$. The modulated light $S_{out}$ is output from the optical output port 1$o$.

The signal electrode 21 (first control electrode) is provided along a part of the first waveguide 5A and is positioned between the first and second ground electrodes 22 and 23 in a plan view. The first ground electrode 22 (second control electrode) is provided along a part of the second waveguide 5B. One end of the signal electrode 21 serves as an RF signal input port, and the other end thereof is connected to the first and second ground electrodes 22 and 23 through a terminal resistor 24. Thus, the signal electrode 21 and first and second ground electrodes 22, 23 function as coplanar traveling-wave electrodes.

The RF signal input port of the signal electrode 21 is input with an electrical signal (modulated signal). The first and second waveguides 5A and 5B are made of an electrooptic material typified by lithium niobate, so that applying an electric field to the first and second waveguides 5A and 5B makes the refractive indices of the first and second waveguides 5A and 5B change like +Δn and −Δn, respectively, causing a change in phase difference between the pair of optical waveguides. A signal light modulated by the change in phase difference is output from the optical output port 1$o$. When phase difference between two lights propagating respectively in the first and second waveguides 5A and 5B is large, the two lights cancel each other, resulting in an OFF state. When the phase difference is small, the intensities of the two lights are enhanced, resulting in an ON state. An extinction ratio refers to a ratio between light intensity when the optical modulator 1 is in an ON state and light intensity when it is in an OFF state. That is, a high extinction ratio is obtained at a combination of a brighter ON state and a darker OFF state, and a low extinction ratio is obtained at a combination of a darker ON state and a brighter OFF state.

For application of DC bias, a pair of bias electrodes (not illustrated) may preferably be provided at positions overlapping respectively the first and second waveguides 5A and 5B in a plan view. One ends of the pair of bias electrodes each serve as an input port for DC bias. The pair of bias electrodes may be provided on the side close to the optical input port 1$i$ or optical output port 1$o$ of the Mach-Zehnder optical waveguide 2 with respect to the signal electrode 21.

In place of providing the bias electrode, a modulated signal on which DC bias is already superimposed may be input to the RF signal input port.

The Mach-Zehnder optical waveguide 2 according to the present embodiment is featured in that the mutually parallel first and second waveguides 5A and 5B branched from the input waveguide 3 each differ in line width depending on the position in the longitudinal direction.

The parallel waveguides 5 (first and second waveguides 5A and 5B) have, in the order from the optical input port 1$i$ side toward the optical output port 1$o$ side, a first uniform width section $Z_{A1}$, a first width transition section $Z_{B1}$, a second uniform width section $Z_{A2}$, a second width transition section $Z_{B2}$, and the first uniform width section $Z_{A1}$. The first straight part $5S_1$ and third straight part $5S_3$ each constitute the first uniform width section $Z_{A1}$, and the second straight part $5S_2$ constitutes the second uniform width section $Z_{A2}$. The first curved part $5C_1$ constitutes the first width transition section $Z_{B1}$, and the second curved part $5C_2$ constitutes the second width transition section $Z_{B2}$.

The first uniform width section $Z_{A1}$ (first section) is a section in which the first and second waveguides 5A and 5B each have a uniform line width and in which the second waveguide 5B has a line width smaller than that of the first waveguide 5A. The second uniform width section $Z_{A2}$ (second section) is a section in which the first and second waveguides 5A and 5B each have a uniform line width and in which the first waveguide 5A has a line width smaller than that of the second waveguide 5B. The first width transition section $Z_{B1}$ is a section in which the line widths of the first and second waveguides 5A and 5B vary. The second width transition section $Z_{B2}$ is a section in which the line widths of the first and second waveguides 5A and 5B vary. In the uniform width section, the line width need not necessarily be completely uniform and may slightly vary as compared to that in the width transition section.

Line widths $W_{a1}$ and $W_{a3}$ of the first waveguide 5A in the first uniform width section $Z_{A1}$ only need to be larger than the second waveguide 5B ($W_{a1} < W_{b1}$, $W_{a3} < W_{b3}$) in the first uniform width section $Z_{A1}$ and need not be larger than a line width $W_{a2}$ of the first waveguide 5A in the in the second uniform width section $Z_{A2}$. That is, the line width $W_{a1}$ of the first waveguide 5A in the first uniform width section $Z_{A1}$ and the line width $W_{a2}$ thereof in the second uniform width section $Z_{A2}$ may have a relation of $W_{a1} < W_{a2}$. Such a relation may apply to the second waveguide 5B.

The entire length ($L_1 + L_5$) of the first uniform width section $Z_{A1}$ is preferably equal to the entire length ($L_3$) of the second uniform width section $Z_{A2}$. That is, the length ($L_1 + L_5$) of a part of the first waveguide 5A that has a line width larger than that of the second waveguide 5B and the length ($L_3$) of a part of the first waveguide 5A that has a line width smaller than that of the second waveguide 5B are preferably equal to each other, and the length ($L_3$) of a part of the second waveguide 5B that has a line width larger than that of the first waveguide 5A and the length ($L_1 + L_5$) of a part of the second waveguide 5B that has a line width smaller than that of the first waveguide 5A are preferably equal to each other. Further, the entire length of the first waveguide 5A in the first and second width transition sections $Z_{B1}$ and $Z_{B2}$ and the entire length of the second waveguide 5B in the first and second width transition sections $Z_{B1}$ and $Z_{B2}$ are preferably equal to each other. However, depending on the level of the extinction ratio required for an optical modulator, the lengths of the first uniform width section $Z_{A1}$ and second uniform width section $Z_{A2}$ need not be completely equal and may be slightly different.

Figure 3A:
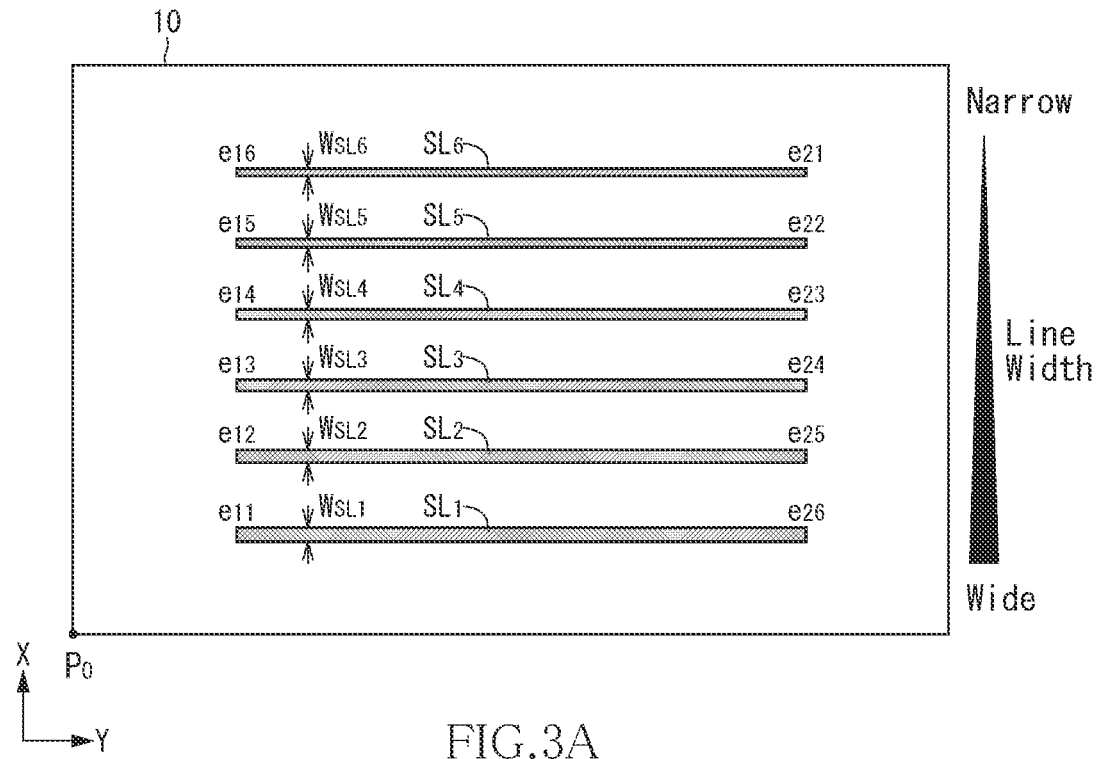
FIGS. 3A and 3B are schematic views for explaining elimination of asymmetry between the pair of optical waveguides.
Figure 3B:
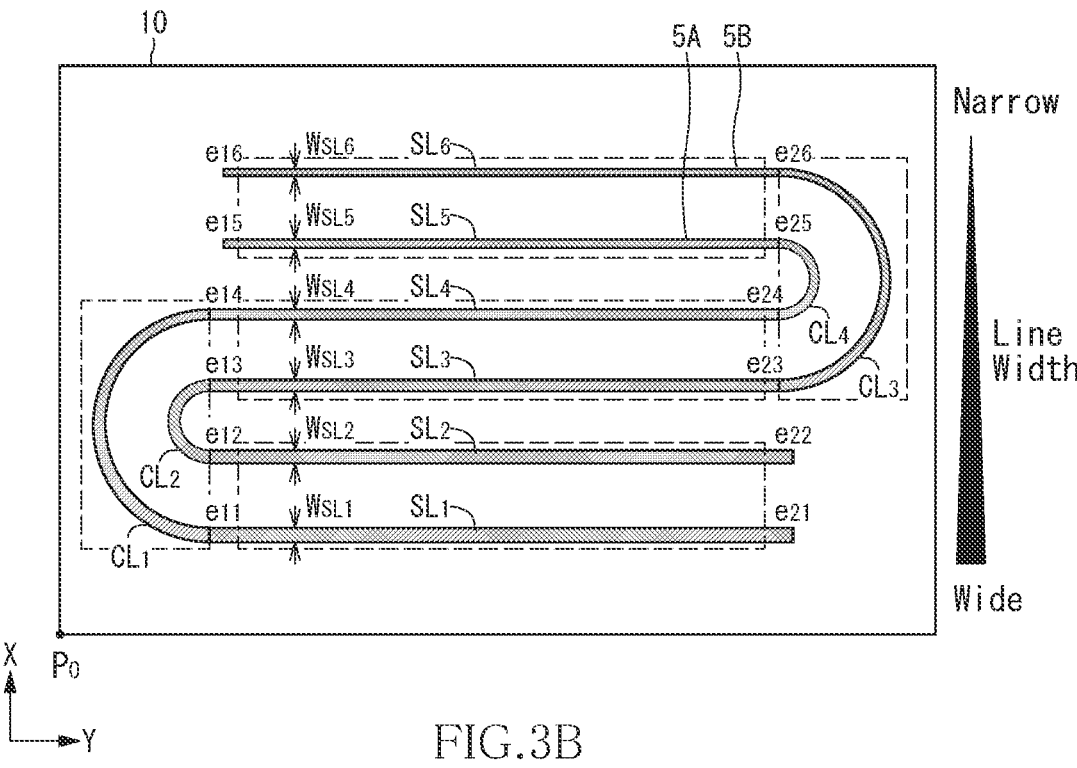

FIGS. 3A and 3B are schematic views for explaining elimination of asymmetry between the pair of optical waveguides.

When a waveguide part 11 on the substrate 10 is processed so as to have a ridge shape to form a plurality of mutually parallel straight waveguides extending in the Y-direction, the line width varies among the straight waveguides due to a manufacturing process. For example, as illustrated in FIG. 3A, out of six straight waveguides $SL_1$ to $SL_6$ extending in the Y-direction, the straight waveguide $SL_1$, which is closest to one end side (origin point $P_0$) in the X-direction, may have a largest line width $W_{SL1}$, and as the position of the straight waveguide becomes more distant from the one end side in the X-direction, the line width may be reduced. That is, the line widths $W_{SL1}$ to $W_{SL6}$ of the six straight waveguides $SL_1$ to $SL_6$ have a relation of $W_{SL1} > W_{SL2} > W_{SL3} > W_{SL4} > W_{SL5} > W_{SL6}$. In this case, the line widths of the two straight waveguides selected from among these straight waveguides and adjacent to each other in the X-direction are always different. This makes the effective refractive indices of the two straight waveguides different, with the result that the extinction ratio of an optical modulator deteriorates.

However, as illustrated in FIG. 3B, when one end $e_{11}$ of the straight waveguide $SL_1$ and one end $e_{14}$ of the straight waveguide $SL_4$ are connected through a curved waveguide $CL_1$, one end $e_{12}$ of the straight waveguide $SL_2$ and one end $e_{13}$ of the straight waveguide $SL_3$ are connected through a curved waveguide $CL_2$, the other end $e_{23}$ of the straight waveguide $SL_3$ and the other end $e_{26}$ of the straight waveguide $SL_6$ are connected through a curved waveguide $CL_3$, and the other end $e_{24}$ of the straight waveguide $SL_4$ and the other end $e_{25}$ of the straight waveguide $SL_5$ are connected through a curved waveguide $CL_4$, sections in which the line width is relatively large and those in which the line width is relative small can be included in a single optical waveguide. Then, as illustrated in FIG. 3, in each of the first and second waveguides 5A and 5B, the entire length of the section having a line width larger than the line width of the counterpart waveguide and the entire length of the section having a line width smaller than the line width of the counterpart waveguide are made substantially equal, whereby asymmetry between the first and second waveguides 5A and 5B can be eliminated. Thus, the effective refractive indices of the pair of optical waveguides can be made to coincide with each other, thereby making it possible to improve the extinction ratio of the optical modulator 1.

Figure 4A:
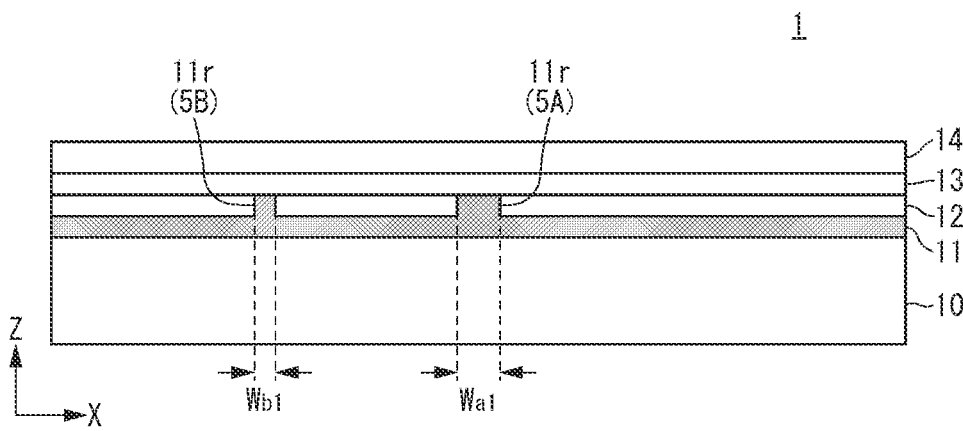
Figure 4B:
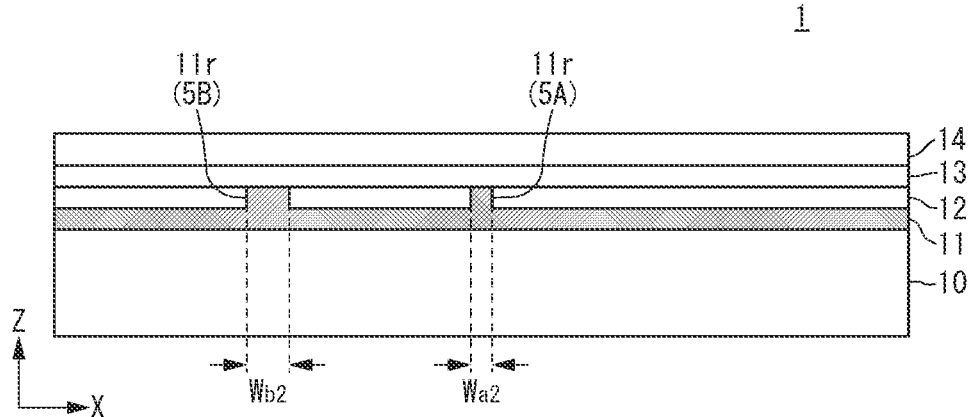
Figure 4C:
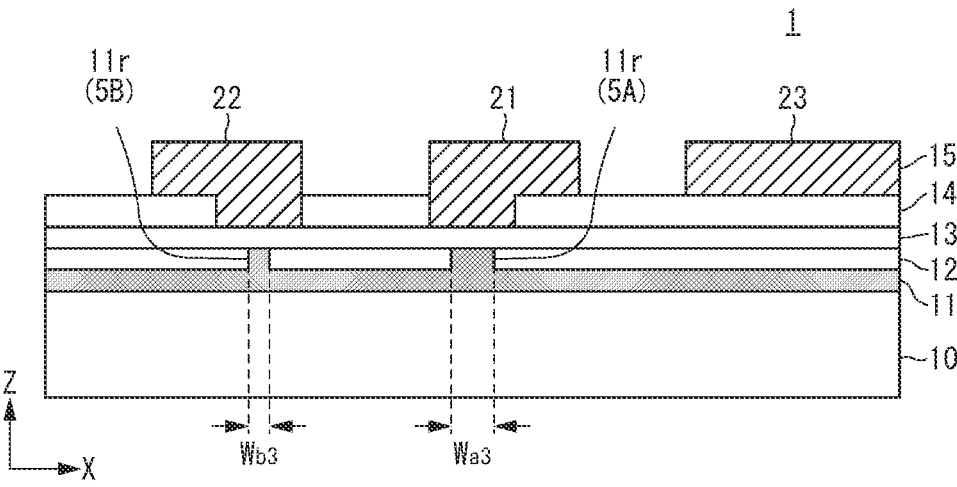

FIGS. 4A to 4C are schematic cross-sectional views of the optical modulator 1 illustrated in FIGS. 1 and 2. FIG. 4A is a cross-sectional view taken along the line Xa-Xa in FIGS. 1 and 2, FIG. 4B is a cross-sectional view taken along the line Xb-Xb in FIGS. 1 and 2, and FIG. 4C is a cross-sectional view taken along the line Xc-Xc in FIGS. 1 and 2.

As illustrated in FIGS. 4A to 4C, the optical modulator 1 according to the present embodiment has a multilayer structure including a substrate 10, a waveguide layer 11, a protective layer 12, a buffer layer 13, an insulating layer 14, and an electrode layer 15 which are stacked in this order.

The substrate 10 is, e.g., a sapphire substrate, and the waveguide layer 11 made of a lithium niobate film, is formed on the surface of the substrate 10. The waveguide layer 11 has the first and second waveguides 5A and 5B (ridge waveguides) each formed by a ridge part 11r. The width of each of the first and second waveguides 5A and 5B can be set to, e.g., about 1 μm. The waveguide layer 11 is not particularly limited as long as it is made of an electrooptic material and is preferably made of lithium niobate ($LiNbO_3$). This is because lithium niobate has a large electrooptic constant and is thus suitable as the constituent material of an electrooptic device such as an optical modulator. When the width of the ridge part 11r is not uniform in the Z-axis direction, the average value thereof is defined as the line width.

The protective layer 12 is formed in an area not overlapping the first and second waveguides 5A and 5B in a plan view. The protective layer 12 covers the entire surface of the waveguide layer 11 excluding portions where the ridge parts 11r are formed, and the side surfaces of the ridge parts 11r are also covered with the protective layer 12, so that a scattering loss caused due to the roughness of the side surfaces of the ridge parts 11r can be prevented. The thickness of the protective layer 12 is substantially equal to the height of each of the ridge parts 11r of the waveguide layer 11. There is no particular restriction on the material of the protective layer 12 and, for example, silicon oxide ($SiO_2$) may be used.

The buffer layer 13 is formed on the upper surface of the ridge parts 11r constituting the first and second waveguides 5A and 5B so as to prevent light propagating in the first and second waveguides 5A and 5B from being absorbed by the signal electrode 21 and first ground electrode 22. The buffer layer 13 is preferably formed of a material having a lower refractive index and a higher transparency than the waveguide layer 11. The thickness of the buffer layer 13 immediately above the ridge parts 11r is preferably 0.3 μm or more and 3 μm or less. The film thickness of the buffer layer 13 is preferably as large as possible in order to reduce light absorption of an electrode and preferably as small as possible in order to apply a high electric field to the first and second waveguides 5A and 5B. The light absorption and applied voltage of an electrode have a trade-off relation, so that it is important to select a material having a high dielectric constant and a low refractive constant in consideration of balance therebetween.

In the present embodiment, although the buffer layer 13 covers not only the upper surfaces of the respective first and second waveguides 5A and 5B, but also the entire underlying surface including the upper surface of the protective layer 12, it may be patterned so as to selectively cover only the vicinity of the upper surfaces of the first and second waveguides 5A and 5B. Further, the buffer layer 13 may be directly formed on the upper surface of the waveguide layer 11 with the protective layer 12 omitted.

The insulating layer 14 is provided to form a level difference on the lower surface of the traveling-wave electrodes. Openings (slits) are formed in areas of the insulating layer 14 that overlap the respective first and second waveguides 5A and 5B to expose the upper surface of the buffer layer 13 therethrough. A part of the electrode layer 15 is embedded in the openings, whereby the level differences are formed respectively on the lower surfaces of the signal electrode 21 and first ground electrode 22. The thickness of the insulating layer 14 is preferably 1 μm or more. When the thickness of the insulating layer 14 is 1 μm or more, an effect brought about by formation of the level difference on the lower surfaces of the respective signal electrode 21 and first ground electrode 22 can be obtained.

The electrode layer 15 is provided with the signal electrode 21, first ground electrode 22, and second ground electrode 23. The signal electrode 21 (first control electrode) is provided so as to overlap the ridge part 11r corresponding to the first waveguide 5A in order to modulate light traveling inside the first waveguide 5A and is opposed to the first waveguide 5A through the buffer layer 13. The first ground electrode 22 (second control electrode) is provided so as to overlap the ridge part 11r corresponding to the second waveguide 5B in order to modulate light traveling inside the second waveguide 5B and is opposed to the second waveguide 5B through the buffer layer 13. The second ground electrode 23 is provided on the side opposite to the first ground electrode 22 with respect to the signal electrode 21.

The signal electrode 21 has a two-layer structure and has an upper layer part 21a formed on the electrode layer 15 and a lower layer part 21b embedded in an opening penetrating the insulating layer 14. The lower layer part 21b of the signal electrode 21 is positioned at the end portion of the upper layer part 21a of the signal electrode 21 on the side close to the first ground electrode 22. Accordingly, the lower surface of the lower layer part 21b of the signal electrode 21 is positioned on the side closer to the first ground electrode 22 than the lower surface of the upper layer part 21a. With such a configuration, the lower surface of the lower layer part 21b of the signal electrode 21 contacts the upper surface of the buffer layer 13 above the first waveguide 5A to cover the first waveguide 5A through the buffer layer 13. The lower surface of the upper layer part 21a of the signal electrode 21 is positioned above the lower surface of the lower layer part 21b and does not contact the buffer layer 13.

The first ground electrode 22 also has a two-layer structure and has an upper layer part 22a formed on the electrode layer 15 and a lower layer part 22b embedded in an opening penetrating the insulating layer 14. The lower layer part 22b of the first ground electrode 22 is positioned at the end portion of the upper layer part 22a of the first ground electrode 22 on the side close to the signal electrode 21. Accordingly, the lower surface of the upper layer part 22a of the first ground electrode 22 is positioned on the side closer to the signal electrode 21 than the lower surface of the lower layer part 22b. With such a configuration, the lower surface of the lower layer part 22b of the first ground electrode 22 contacts the upper surface of the buffer layer 13 above the second waveguide 5B to cover the second waveguide 5B through the buffer layer 13. The lower surface of the upper layer part 22a of the first ground electrode 22 is positioned above the lower surface of the lower layer part 22b and does not contact the buffer layer 13.

The second ground electrode 23 is provided on the side opposite to the first ground electrode 22 with respect to the signal electrode 21. Although the second ground electrode 23 has a single-layer structure including only a conductor provided in the electrode layer 15, it may have a two-layer structure like the signal electrode 21 and first ground electrode 22.

As described above, a pair of optical waveguides sometimes have asymmetry in terms of the line width due to a manufacturing process, and this may result in deterioration in the extinction ratio. However, in the first uniform width section $Z_{A1}$, the line widths $W_{a1}$ and $W_{a3}$ of the first waveguide 5A are made larger than the line widths $W_{b1}$ and $W_{b3}$ of the second waveguide 5B as illustrated in FIGS. 4A and 4C and, conversely, in the second uniform width section $Z_{A2}$, the line width $W_{b2}$ of the second waveguide 5B is made larger than the line width $W_{a2}$ of the first waveguide 5A as illustrated in FIG. 4B to make the length of the first uniform width section $Z_{A1}$ and the length of the second uniform width section $Z_{A2}$ substantially equal to each other. This can enhance symmetry in terms of the line width between a pair of waveguides to improve the extinction ratio.

The following describes in detail the configuration of the optical modulator 1 when the waveguide layer 11 is made of a lithium niobate film.

While the substrate 10 is not particularly limited in configuration as long as it has a refractive index lower than that of a lithium niobate film, a substrate for which a lithium niobate film is used as an epitaxial film is preferable, and a sapphire single crystal substrate or a silicon single crystal substrate is particularly preferable. The crystal orientation of the single crystal substrate is not particularly limited. The lithium niobate film is easily formed as a c-axis oriented epitaxial film for single crystal substrates with various crystal orientations. The c-axis oriented lithium niobate film has three-fold symmetry and, thus, an underlying single crystal substrate desirably also has the same symmetry. As the sapphire single crystal substrate, a c-plane substrate is preferable. As the silicon single crystal substrate, a (111)-plane substrate is preferable.

The term "epitaxial film", as used herein, refers to a film having the crystal orientation of the underlying substrate or underlying film. Assuming that the film surface extends in X-Y plane and that the film thickness direction is Z-axis direction, the crystal of the epitaxial film is uniformly oriented along the X-, Y-, and Z-axes. For example, an epitaxial film can be confirmed by, firstly, measuring the peak intensity at the orientation position by 2θ-θ X-ray diffraction and, secondly, observing poles.

Specifically, firstly, in the 2θ-θ X-ray diffraction measurement, all the peak intensities except for the peak intensity on a target surface must be 10% or less, preferably 5% or less, of the maximum peak intensity on the target surface. For example, in a c-axis oriented epitaxial lithium niobate film, the peak intensities except for the peak intensity on a (00L) surface are 10% or less, preferably 5% or less, of the maximum peak intensity on the (00L) surface. The (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since $LiNbO_3$ has a trigonal crystal system structure, single crystal $LiNbO_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a silicon single crystal substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of LixNbAyOz. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of 2 μm or less. This is because a high-quality lithium niobate film having a thickness more than 2 μm is difficult to form. The lithium niobate film having an excessively small thickness cannot completely confine light in it, allowing the light to penetrate through the substrate 10 and/or the buffer layer 13. Application of an electric field to the lithium niobate film may therefore cause a small change in the effective refractive index of the optical waveguide. Thus, the lithium niobate film preferably has a film thickness that is at least approximately one-tenth of the wavelength of light to be used.

The film thickness of the lithium niobate film in the electric field applying region is preferably 1 μm or more and particularly preferably 1.4 μm or more. In a case where the wavelength of light is 1550 nm for optical communication systems, the lithium niobate film having a film thickness of less than 1 μm undergoes abrupt increase in the half wavelength voltage Vπ, making it difficult to set the half wavelength voltage Vπ to 3V or less which is a practical voltage value. That is, the lithium niobate film having a small thickness cannot completely confine light in it, whereby an electrooptic effect effectively decreases. On the other hand, the lithium niobate film having a film thickness of 1.5 μm or more can sufficiently confine light, so that even if the film thickness is increased some more, Vπ hardly changes. As described above, when the film thickness of the lithium niobate film is set to 1 μm or more, a drive voltage and a propagation loss can be reduced.

The lithium niobate film is preferably formed using a film formation method, such as sputtering, CVD or sol-gel process. Application of an electric field in parallel to the c-axis of the lithium niobate that is oriented perpendicular to the main surface of the substrate 10 can change the optical refractive index in proportion to the electric field. In the case of the single crystal substrate made of sapphire, the lithium niobate film can be directly epitaxially grown on the sapphire single crystal substrate. In the case of the single crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

As described above, the optical modulator 1 according to the present embodiment has the Mach-Zehnder optical waveguide 2 including the mutually parallel first and second waveguides 5A and 5B branched from the single input waveguide 3 and the traveling-wave electrodes that applies an electric field to the first and second waveguides 5A and 5B. The first and second waveguides 5A and 5B have the first uniform width section $Z_{A1}$ in which the line width of the second waveguide 5B is larger than that of the first waveguide 5A, the second uniform width section $Z_{A2}$ in which the line width of the first waveguide 5A is larger than that of the second waveguide 5B, and first and second width transition sections $Z_{B1}$ and $Z_{B2}$ each provided between the first and second uniform width sections $Z_{A1}$ and $Z_{A2}$ and each having a varied waveguide line width. The length of the first uniform width section $Z_{A1}$ and the length of the second uniform width section $Z_{A2}$ are equal to each other, so that asymmetry between the pair of optical waveguides due to a manufacturing process can be eliminated. This prevents background light outside the operating wavelength from being brought in a guided state when the operating wavelength of input/output light is in an OFF state to thereby prevent deterioration in the extinction ratio.

Figure 5A:
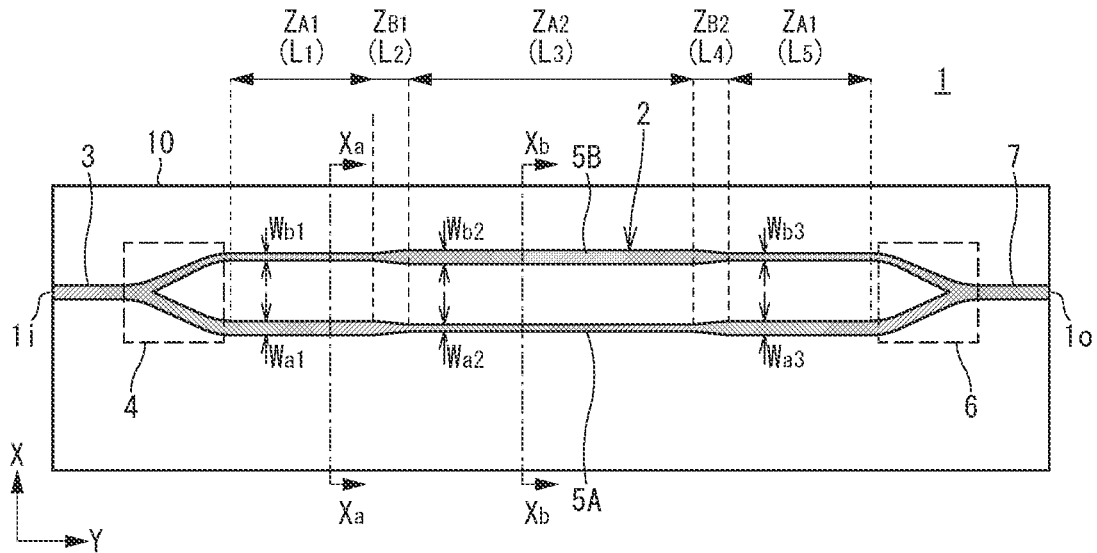
Figure 5B:
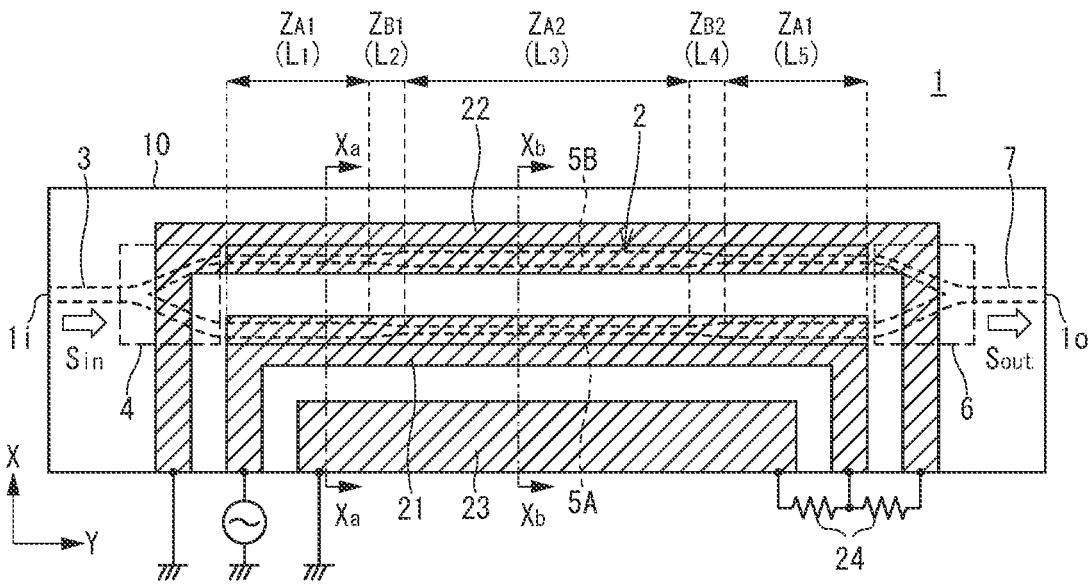
Figure 6A:
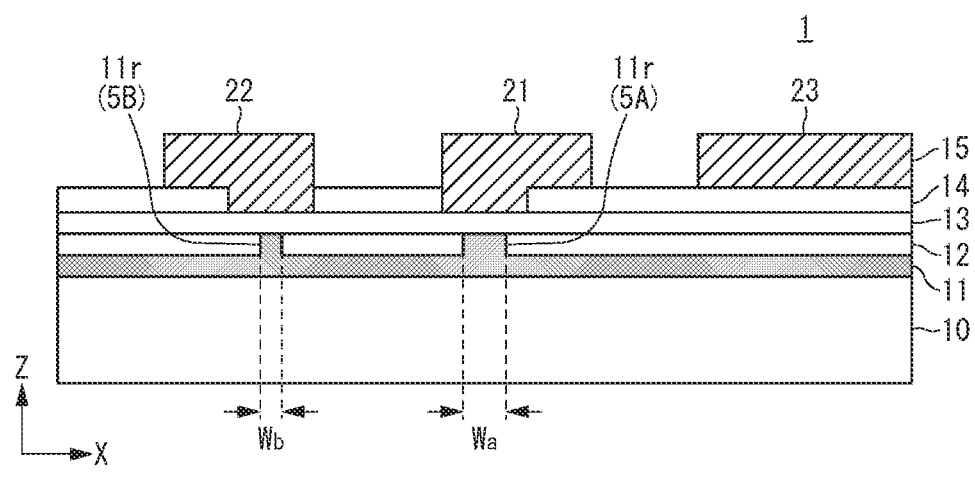
Figure 6B:
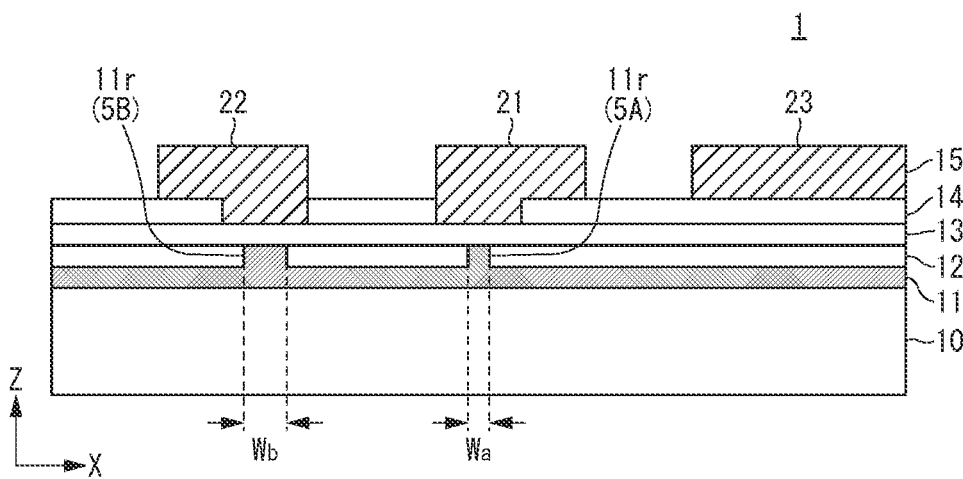

FIGS. 5A and 5B are schematic plan views each illustrating the configuration of an optical modulator according to a second embodiment of the present invention. FIG. 5A illustrates only an optical waveguide, and FIG. 5B illustrates the entire configuration of the optical modulator including a traveling-wave electrode. FIGS. 6A and 6B are schematic cross-sectional views of the optical modulator 1 illustrated in FIGS. 5A and 5B. FIG. 6A is a cross-sectional view taken along the line Xa-Xa in FIGS. 5A and 5B, and FIG. 6B is a cross-sectional view taken along the line Xb-Xb in FIGS. 5A and 5B.

As illustrated in FIGS. 5A and 5B, the optical modulator 1 according to the present embodiment is featured in that the first and second waveguides 5A and 5B of the Mach-Zehnder optical waveguide 2 are each constituted by a straight part. Further, as shown in FIGS. 6A and 6B, the optical modulator 1 has a multilayer structure including a substrate 10, a waveguide layer 11, a protective layer 12, a buffer layer 13, an insulating layer 14, and an electrode layer 15 which are stacked in this order. This structure is the same as that of the first embodiment.

In the present embodiment, the first uniform width section $Z_{A1}$ is a section in which the first and second waveguides 5A and 5B each have a uniform line width and in which the second waveguide 5B has a line width smaller than that of the first waveguide 5A. The second uniform width section $Z_{A2}$ is a section in which the first and second waveguides 5A and 5B each have a uniform line width and in which the first waveguide 5A has a line width smaller than that of the second waveguide 5B. The first width transition section $Z_{B1}$ is a section in which the line widths of the first and second waveguides 5A and 5B vary. The second width transition section $Z_{B2}$ is a section in which the line widths of the first and second waveguides 5A and 5B vary.

As in the first embodiment, the entire length $(L_1+L_5)$ of the first uniform width section $Z_{A1}$ is preferably equal to the entire length $(L_3)$ of the second uniform width section $Z_{A2}$. That is, the length $(L_1+L_5)$ of a part of the first waveguide 5A that has a line width larger than that of the second waveguide 5B and the length $(L_3)$ of a part of the first waveguide 5A that has a line width smaller than that of the second waveguide 5B are preferably equal to each other, and the length $(L_3)$ of a part of the second waveguide 5B that has a line width larger than that of the first waveguide 5A and the length $(L_1+L_5)$ of a part of the second waveguide 5B that has a line width smaller than that of the first waveguide 5A are preferably equal to each other. Further, the entire length of the first waveguide 5A in the first and second width transition sections $Z_{B1}$ and $Z_{B2}$ and the entire length of the second waveguide 5B in the first and second width transition sections $Z_{B1}$ and $Z_{B2}$ are preferably equal to each other. However, depending on the level of the extinction ratio required for an optical modulator, the lengths of the first uniform width section $Z_{A1}$ and second uniform width section $Z_{A2}$ need not be completely equal and may be slightly different. According to the present embodiment, it is possible to enhance symmetry between the first and second waveguides 5A and 5B to thereby improve the extinction ratio.

In conventional optical modulators, one of the first and second waveguides 5A and 5B constituting the Mach-Zehnder optical waveguide 2 may have a line width slightly larger than the other one thereof over the entire length, and this results in deterioration in the extinction ratio due to longitudinally nonuniform distribution (asymmetry) of the line width of an optical waveguide. However, in the present embodiment, in each of the first and second waveguides 5A and 5B, the length of a part having a line width larger than the line width of the counterpart waveguide and the entire length of a part having a line width smaller than the line width of the counterpart waveguide are made equal, whereby it is possible to enhance symmetry between the first and second waveguides 5A and 5B to thereby improve the extinction ratio.

While the preferred embodiments of the present invention has been described, the present invention is not limited to the above embodiments, and various modifications may be made within the scope of the present invention, and all such modifications are included in the present invention.

For example, although a single drive type optical modulator is taken as an example in the above embodiment, the electrode structure of the optical modulator is not particularly limited, and the present invention may be applied to a so-called dual drive type optical modulator. Further, although the optical modulator has a single channel structure in which a single Mach-Zehnder optical modulator is provided on the substrate 10 in the above embodiment, it may have a multi-channel array structure provided with a plurality of Mach-Zehnder optical modulators.

Example

Influences of a difference in the line length between the first uniform width section $Z_{A1}$ and the second uniform width section $Z_{A2}$ of the first and second waveguides 5A and 5B on the extinction ratio were verified.

Figure 7:
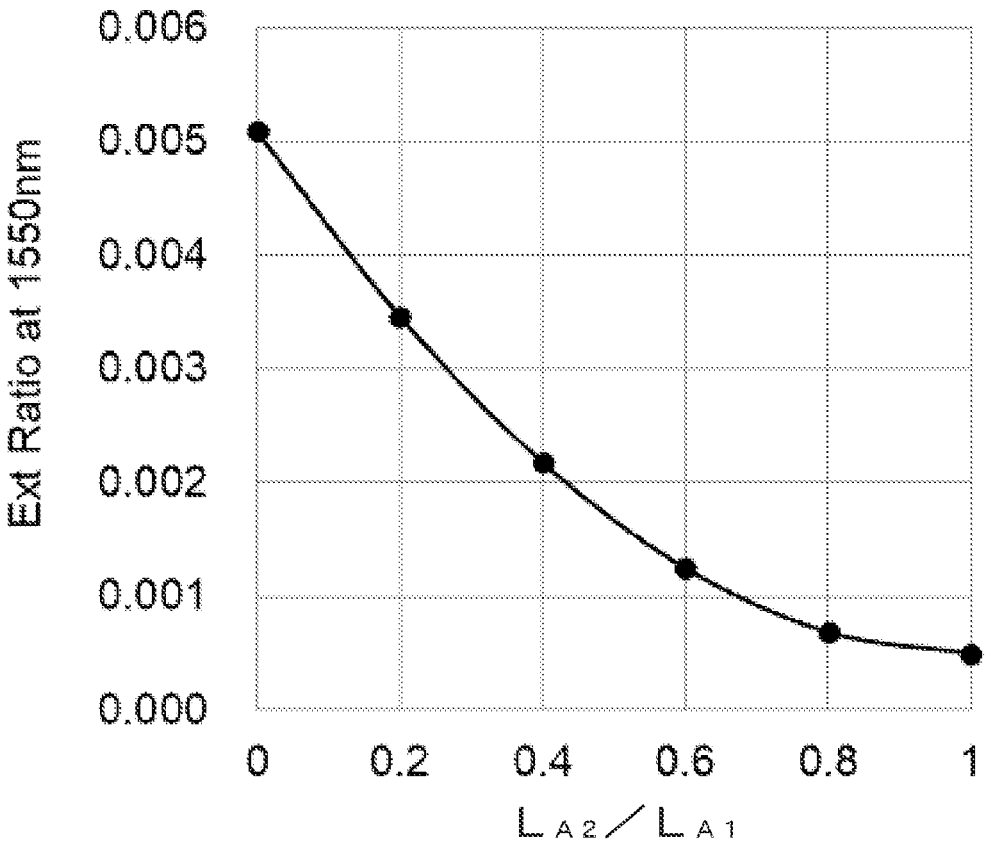
FIG. 7 is a graph showing a relationship between a ratio of a length $L_{A2}$ of a second line width constant section $Z_{A2}$ to a length $L_{A1}$ of a first line width constant section $Z_{A1}$ and an extinction ratio of the optical modulator, wherein the horizontal axis thereof indicates $L_{A2}/L_{A1}$, and the vertical axis thereof indicates the extinction ratio at an operating wavelength of 1550 nm.

Assuming that an optical path length difference $\Delta nd_1 = 5000$ nm when the length of the first uniform width section $Z_{A1}$ is $L_{A1}$ and that an optical path length difference $\Delta nd_2 = 5000$ nm $\times L_{A2}/L_{A1}$ when the length of the second uniform width section $Z_{A2}$ is $L_{A2}$, the relation between the extinction ratio (Ext ratio), which is obtained when the optical path length difference of the entire Mach-Zehnder optical waveguide$= \Delta nd_{12}$ ($\Delta nd_1 - \Delta nd_2$) and an operating wavelength$=1550$ nm, and $L_{A2}/L_{A1}$ is illustrated in the graph of FIG. 7.

As can be seen from FIG. 7, when the specification of the extinction ratio of an optical modulator is 28 dB or more, the required specification is satisfied under the condition of $L_{A2}/L_{A1} > 0.5$. That is, when the optical path length difference $\Delta nd$ is 5000 nm in the uniform width section, a desired extinction ratio can be obtained when $L_{A2}/L_{A1} > 0.5$ is satisfied, and thus $L_{A1} = L_{A2}$ need not be satisfied.

REFERENCE SIGNS LIST

1: optical modulator
1$i$: optical input port
1$o$: optical output port
2: Mach-Zehnder optical waveguide
3: input waveguide
4: demultiplexer
5: parallel waveguide
5A: first waveguide
5B: second waveguide
$5C_1$: first curved part
$5C_2$: second curved part
$5S_1$: first straight part
$5S_2$: second straight part
$5S_3$: third straight part
6: multiplexer
7: output waveguide part
10: substrate
11: waveguide part 11$r$: ridge part
12: protective layer
13: buffer layer
14: insulating layer
15: electrode layer
21: signal electrode (first control electrode)
21$a$: upper layer part of signal electrode
21$b$: lower layer part of signal electrode
22: first ground electrode (second control electrode)
22$a$: upper layer part formed on first ground electrode
22$b$: lower layer part formed on first ground electrode
23: second ground electrode
24: terminal resistor
$CL_1$-$CL_4$: curved waveguide
$SL_1$-$SL_6$: straight waveguide
$S_{in}$: input light
$S_{out}$: modulated light (output light)
$Z_{A1}$: first uniform width section (first section)
$Z_{A2}$: second uniform width section (second section)
$Z_{B1}$: first width transition section
$Z_{B2}$: second width transition section

What is claimed is:

1. An optical modulator comprising:
a Mach-Zehnder optical waveguide having an input waveguide, a demultiplexer demultiplexing light propagating in the input waveguide, first and second waveguides extending in parallel from the demultiplexer, a multiplexer multiplexing lights propagating in the first and second waveguides, and an output waveguide propagating light output from the multiplexer; and
a signal electrode controlling a phase of light propagating in the Mach-Zehnder optical waveguide,
wherein the first and second waveguides each include:
a first straight section in which a line width of the second waveguide is smaller than a line width of the first waveguide;
a second straight section provided parallel to the first straight section and in which a line width of the first waveguide is smaller than a line width of the second waveguide so as to balance optical paths of the first waveguide and the second waveguide; and
a first curved section connecting the first straight section and the second straight section,
wherein the first straight section is disposed closer to the input waveguide than the second straight section,
wherein the line width of the first waveguide in the first straight section is smaller than the line width of the first waveguide in the second straight section while the line width of the second waveguide in the first straight section is smaller than the line width of the second waveguide in the second straight section, and
wherein a line width of the first waveguide in the first curved section continuously increases from the line width of the first waveguide in the first straight section to the line width of the first waveguide in the second straight section through an entirety of the first curved section, while a line width of the second waveguide in the first curved section continuously increases from the line width of the second waveguide in the first straight section to the line width of the second waveguide in the second straight section through the entirety of the first curved section.

2. The optical modulator as claimed in claim 1, wherein the first and second waveguides include:

a third straight section provided parallel to the second straight section in which the line width of the second waveguide is smaller than the line width of the first waveguide; and a second curved section connecting the second straight section and the third straight section, wherein the second straight section is disposed closer to the input waveguide than the third straight section, the line width of the second waveguide in the second straight section is smaller than the line width of the second waveguide in the third straight section, and each line width of the first and second waveguides in the second curved section continuously transitions from a line width in the second straight section to a line width in the third straight section in through an entirety of the second curved section.

3. The optical modulator as claimed in claim 2, wherein the Mach-Zehnder optical waveguide is a ridge waveguide wherein a lithium niobate film formed on a substrate is shaped into a ridge.

4. The optical modulator as claimed in claim 2, wherein a total length of the first straight section and the third straight section is equal to a length of the second straight section.

5. The optical modulator as claimed in claim 1, wherein the Mach-Zehnder optical waveguide is a ridge waveguide wherein a lithium niobate film formed on a substrate is shaped into a ridge.

* * * * *